United States Patent
Alfano et al.

(10) Patent No.: US 7,492,139 B2
(45) Date of Patent: *Feb. 17, 2009

(54) DIGITAL CONTROL CIRCUIT FOR SWITCHING POWER SUPPLY WITH SERIAL DATA INPUT

(75) Inventors: Donald E. Alfano, Round Rock, TX (US); Paul Highley, Austin, TX (US); Kenneth W. Fernald, Austin, TX (US)

(73) Assignee: Silicon Labs CP, Inc., Austin, TX (US)

( * ) Notice: Subject to any disclaimer, the term of this patent is extended or adjusted under 35 U.S.C. 154(b) by 54 days.

This patent is subject to a terminal disclaimer.

(21) Appl. No.: 11/382,462

(22) Filed: May 9, 2006

(65) Prior Publication Data

US 2006/0215644 A1    Sep. 28, 2006

Related U.S. Application Data

(63) Continuation of application No. 10/742,509, filed on Dec. 19, 2003, now Pat. No. 7,042,201.

(51) Int. Cl.
*G05F 1/40* (2006.01)
(52) U.S. Cl. .................. 323/283; 323/241; 323/351
(58) Field of Classification Search .......... 363/17, 363/63, 98, 132; 323/241, 246, 283, 284, 323/285, 290, 322, 351
See application file for complete search history.

(56) References Cited

U.S. PATENT DOCUMENTS

| | | | | |
|---|---|---|---|---|
| 6,600,300 B2 * | 7/2003 | Groeneveld et al. | ......... | 323/282 |
| 6,906,503 B2 * | 6/2005 | Lopez-Santillana et al. | . | 323/283 |
| 6,954,054 B2 * | 10/2005 | Brown | ......... | 323/283 |
| 6,977,492 B2 * | 12/2005 | Sutardja et al. | ......... | 323/283 |
| 6,979,987 B2 * | 12/2005 | Kernahan et al. | ......... | 323/283 |

* cited by examiner

*Primary Examiner*—Jessica Han
(74) *Attorney, Agent, or Firm*—Howison & Arnott, L.L.P.

(57) ABSTRACT

A method is disclosed for converting DC power from a first voltage level on an input to a different voltage level on an output for delivery to a load. The method includes switching current in a switching operation from the input to the output through an inductive element and measuring the voltage/current parameters on the input and output. A control algorithm is then utilized to determine control parameters necessary to make a control move to effect the switching operation, the control algorithm utilizing as inputs the measured voltage/current parameters. A digital control system controls the switching operation, which digital control system is operable to be controlled by the control algorithm. Configuration data is received on a serial data bus for configuring the control algorithm. Thereafter, the operation of the control algorithm is modified in response to receiving the configuration information.

7 Claims, 4 Drawing Sheets

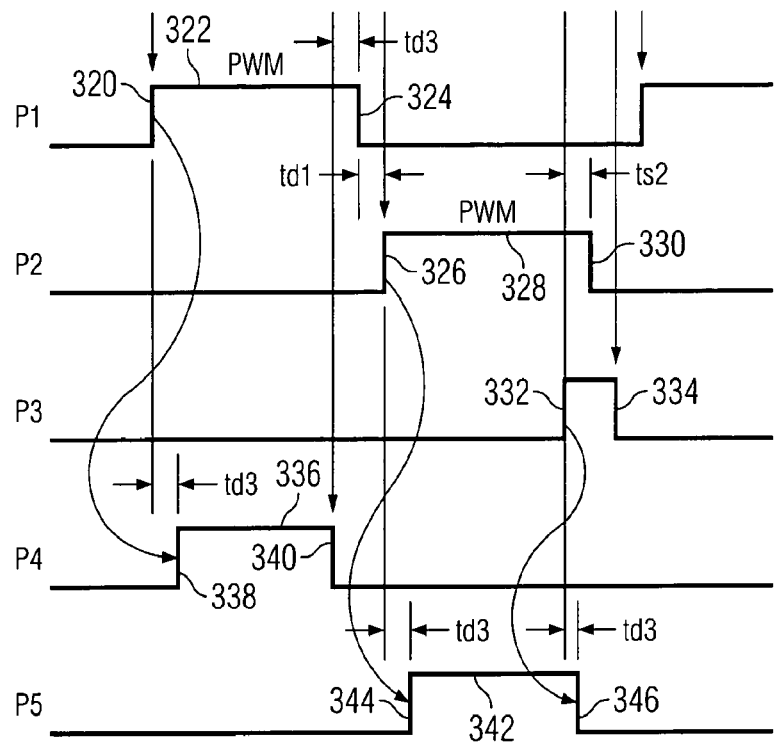
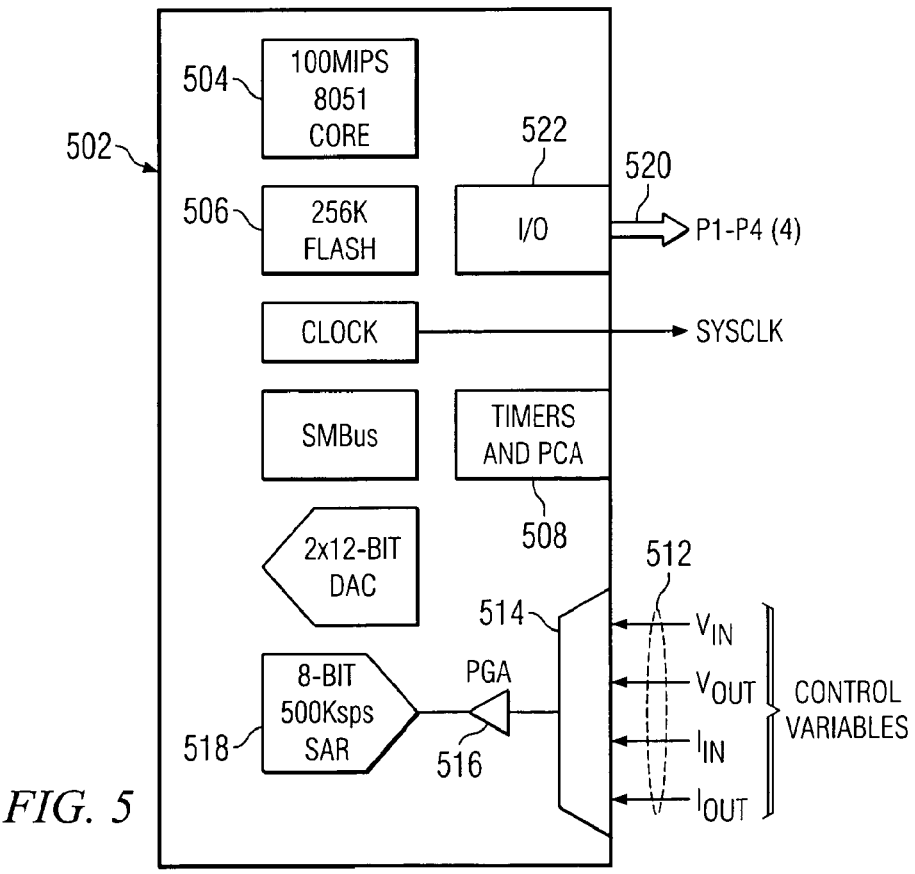
FIG. 3
FIG. 5

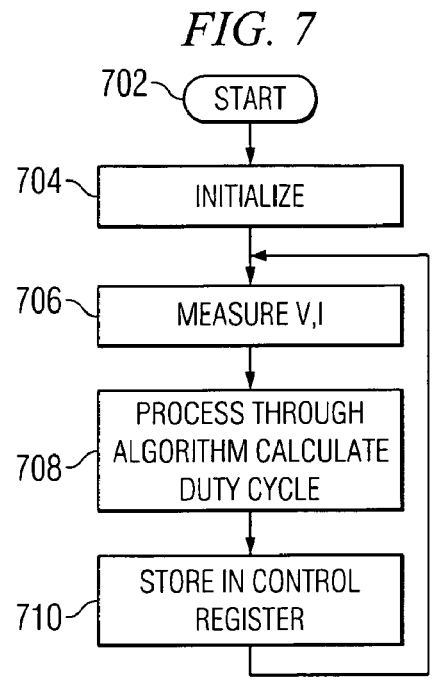
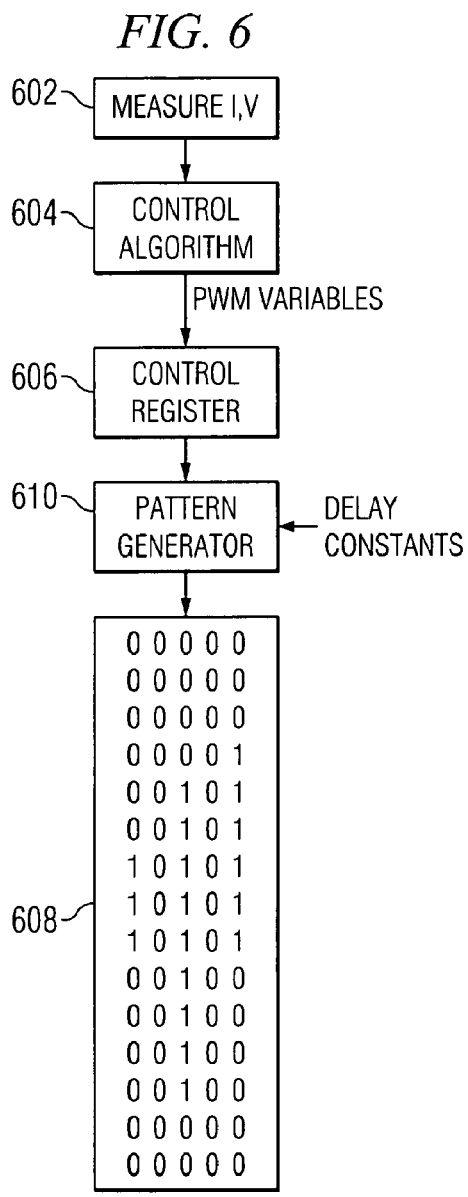
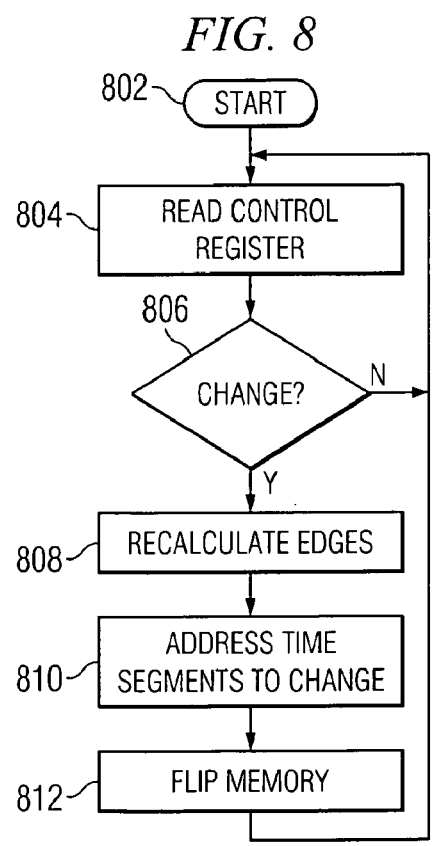

DIGITAL CONTROL CIRCUIT FOR SWITCHING POWER SUPPLY WITH SERIAL DATA INPUT

CROSS REFERENCE TO RELATED APPLICATIONS

This application is a Continuation of U.S. Pat. No. 7,042,201, issued May 9, 2006, and entitled, "DIGITAL CONTROL CIRCUIT FOR SWITCHING POWER SUPPLY WITH PATTERN GENERATOR," which is incorporated herein by reference.

TECHNICAL FIELD OF THE INVENTION

The present invention pertains in general to switching power supplies and, more particularly, to the digital control circuit for controlling the operation thereof.

BACKGROUND OF THE INVENTION

Switching power supplies utilize a plurality of switches which are turned on and off to switch an input DC voltage across a transformer to a load, the output voltage at a different DC voltage level. By switching the current inductively coupled through the transformer to the load in a particular manner, a DC output voltage at a different voltage level than the input DC voltage level can be provided to the load. The control of the switching is typically facilitated with some type of control circuit. This control circuit can be an analog control circuit formed from a plurality of analog discrete devices, or it can be a digital circuit.

In digital control circuits, Digital Signal Processors (DSPs) have been utilized. The DSPs control the duty cycle and relative timing of the switches such that the edges of each control pulse to the various transistor switches controlling power delivery to the load will be varied. In order to perform this operation in the digital domain, the DSP must perform a large number of calculations, which requires a fairly significant amount of code to be generated to support a specific power supply topology, operating frequency, component characteristics and performance requirements. For example, inductor size decreases with increasing PWM frequency: dead times increase with increasing transistor turn-off times, and so on. Although DSPs can handle the regulation tasks, they are fairly complex and expensive and code changes in power supply applications are difficult.

SUMMARY OF THE INVENTION

The present invention disclosed and claimed herein, in one aspect thereof, comprises a method for converting DC power from a first voltage level on an input to a different voltage level on an output for delivery to a load. The method includes switching current in a switching operation from the input to the output through an inductive element and measuring the voltage/current parameters on the input and output. A control algorithm is then utilized to determine control parameters necessary to make a control move to effect the switching operation, the control algorithm utilizing as inputs the measured voltage/current parameters. A digital control system controls the switching operation, which digital control system is operable to be controlled by the control algorithm. Configuration data is received on a serial data bus for configuring the control algorithm. Thereafter, the operation of the control algorithm is modified in response to receiving the configuration information.

BRIEF DESCRIPTION OF THE DRAWINGS

For a more complete understanding of the present invention and the advantages thereof, reference is now made to the following description taken in conjunction with the accompanying Drawings in which:

FIG. 3 illustrates the timing diagram for the control pulses to the switching power supply;

FIG. 5 illustrates a single chip version of the embodiment of FIG. 4;

FIG. 6 illustrates a diagrammatic view of the pattern generation operation;

FIG. 7 illustrates a flow chart depicting the control operation; and

FIG. 8 illustrates a flow chart depicting the pattern generation operation.

DETAILED DESCRIPTION OF THE INVENTION

Figure 1:
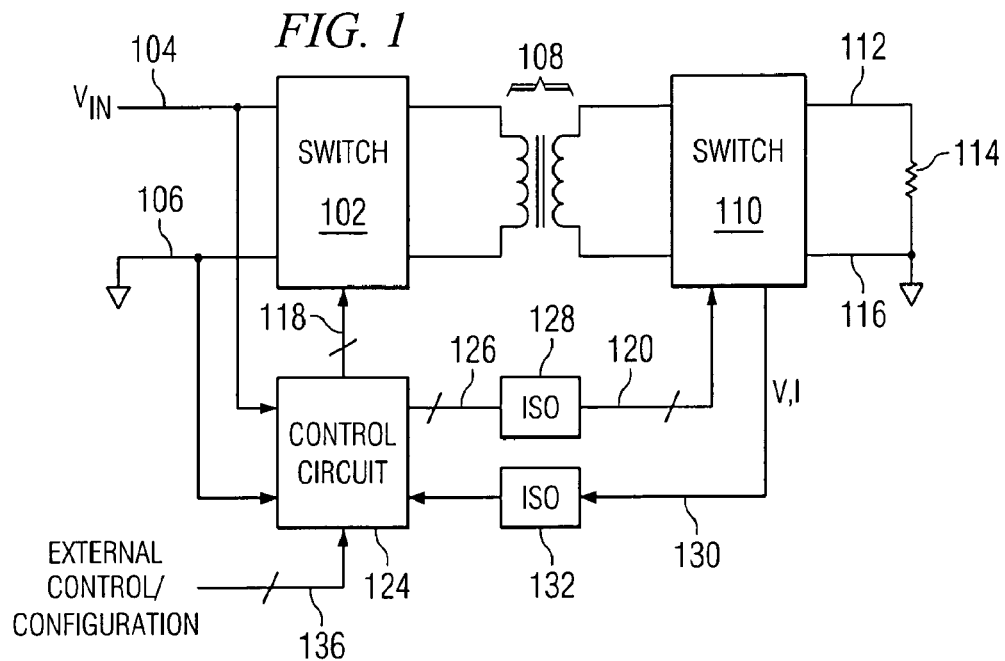
FIG. 1 illustrates an overall block diagram of a switching power supply utilizing the digital control circuit of the present disclosure.

Referring now to FIG. 1, there is illustrated a top level schematic diagram for the switching power supply of the present embodiment. The main portion of the power supply comprises a primary switch 102 that is operable to receive an input voltage on a node 104, this being a DC voltage, and ground on a node 106. The primary switch group 102 is coupled through an isolation transformer 108 to a secondary switch group 110. The secondary switch group 110 is operable to drive an output voltage node 112 that is connected to one terminal of a load 114, the secondary switch group 110 also having a ground connection on a node 116, the load 114 disposed between the node 112 and the node 116. The two switch groups 102 and 110 are operable to operate in conjunction with various pulse inputs on a control bus 118 associated with the primary switch group 102 and with various pulse inputs on a control bus 126 associated with the secondary switch group 110.

A digital control circuit 124 is provided which is operable to control the operation of the primary switch group 102 and the secondary switch group 110. The nodes 104, 106 and 137 are provided as inputs to the digital control circuit 124 for sensing the voltage and current on the primary, the digital control circuit 124 generating the information on the bus 118 for control of the primary switch group 102. The control circuit 124 must be isolated from the secondary switch group 110. This is facilitated by driving a bus 126 through an isolation circuit 128, such as an opto-isolator, to drive the bus 120. Similarly, the control circuit 124 is operable to sense the voltage and current levels on the output node 112 through sense lines 130 which are also connected through an isolation circuit 132 to the digital control circuit 124. The digital control circuit 124 is also interfaced to a bus 136 to receive external control/configuration information. This can be facilitated with a serial data bus such as an SMB serial data bus.

Figure 2:
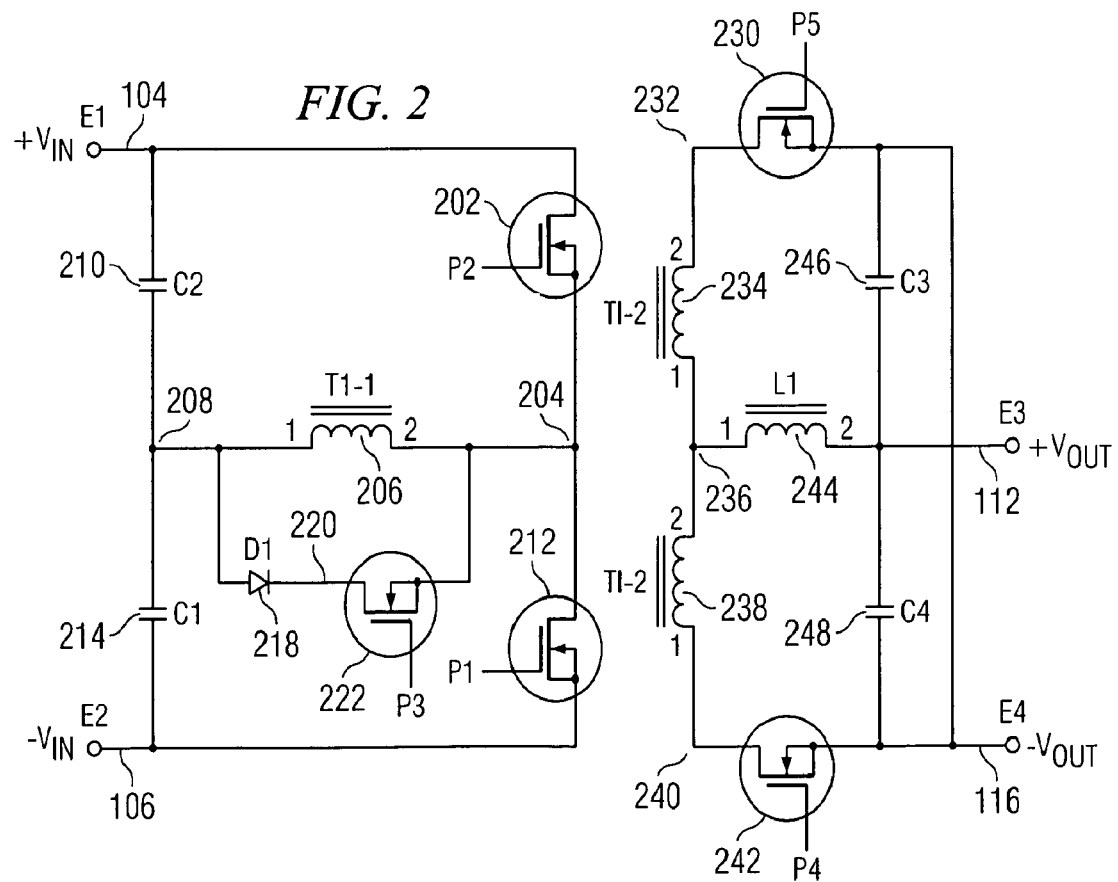
FIG. 2 illustrates a schematic diagram of the switching portion of a half-bridge power supply.

Referring now to FIG. 2, there is illustrated a detailed schematic diagram of the primary switch group 102, isolation transformer 108 and secondary switch group 110. The node 104 is connected to one side of the source-drain path of a power switching transistor 202, the other side thereof connected to a node 204. Node 204 is connected to one side of the primary of transformer 108, a primary 206. The other side of primary 206 is connected to a node 208. Node 208 is coupled to node 104 through a capacitor 210. Node 106 is coupled to one side of the source-drain path of a switching transistor 212, the other side thereof connected to node 204. Node 208 is coupled through a capacitor 214 to node 106. A diode 218 has the anode thereof connected to node 208 and the cathode thereof connected to a node 220, node 220 connected to one side of the source-drain path of a switching transistor 222, the other side thereof connected to node 204.

Switching transistor 212 is controlled by a switching pulse P1, the gate of switching transistor 202 controlled by a switching pulse P2 and the gate of switching transistor 222 controlled by switching pulse P3. Switching pulses P1, P2 and P3 all form part of the bus 118.

The secondary switch group 110 is comprised of a switching transistor 230 having source-drain path thereof connected between the node 116 and a node 232, the gate thereof controlled by a switching pulse P5. Node 232 is connected to one side of a winding 234 which forms part of the secondary of the isolation transformer 108. The other side of winding 234 is connected to a center tap node 236, node 236 connected to one side of a winding 238, the other side thereof connected to a node 240. Winding 238 and winding 234 form the secondary of transformer 108.

Node 240 is connected to one side of the source-drain path of a switching transistor 242, the other side thereof connected to node 116 and the gate thereof connected to a switching pulse P4. An inductor 244 is connected between node 236 and the output node 112. The output node 112 is coupled to the ground node 116 through a capacitor 246 which is connected proximate to the other side of the source-drain path of transistor 230 and coupled through a capacitor 248 to node 116 proximate to the other side of the source-drain path of switching transistor 242.

Referring now to FIG. 3, there is illustrated a timing diagram for generating the switching pulses to operate the switch of FIG. 2. The switching pulse P1 is a pulse-width modulated switching pulse having a rising edge 320. The rising edge 320 changes the level to a high level 322 which then returns to the low level at a falling edge 324. The switching pulse P2 is delayed from the falling edge 324 by a delay $t_{d1}$. The rising edge 326 changes the level of switching pulse P2 to a high level 328 followed by a change back to a low level having a falling edge 330. The switching pulse P3 goes from a low level to a high level ahead of the falling edge of P1 by delay time $t_{d2}$. The switching pulse P3 goes low ahead of the falling edge of P2 by delay time $t_{d3}$.

In the output switch, the switching pulse P4 goes from a low level to a high level 336 at a rising edge 338. The rising edge 338 is delayed from the rising edge 320 by a delay $t_{d3}$. The switching pulse P4 returns to a low level ahead of the falling edge P2 by delay time $t_{d3}$. The switching pulse P5 goes from a low level to a high level 342 at a rising edge 344 which is delayed from edge 326 of switching pulse P2 by a delay $t_{d3}$. Switching pulse P5 returns to a low level ahead of the rising edge of P3 by delay $t_{d3}$.

It can be seen that the switches 202 and 212 in FIG. 2 are controlled by switching pulses P1 and P2. The delay $t_{d1}$ is the duration of time required for transistor 212 to go from a conducting state to a non-conducting state and prior to transistor 202 going to a conducting state. The delay $t_{d1}$ is a delay that is required in order to ensure that the switches are completely off such that connecting the node 204 to the ground node 106 does not cause current to flow through transistor 202. This could result in a "shoot-through" current spike. Depending upon the circuit components and operating frequency, it may be required to vary this delay. Similarly, transistor 222 will be turned on prior to turning off switch 202 with the delay $t_{d2}$ allowing the diode 218 to be placed in parallel with the primary 206 prior to turning off transistor 202. Similarly, on the output switch, it is necessary that transistor 242 is maintained in a non-conducting state until transistor 322 is fully turned on and node 204 is sufficiently grounded. Further, it is necessary that the falling edge 346 be delayed until the transistor 222 has fully turned on, which requires the delay $t_{d3}$. This timing is conventional and, depending upon the application, the various delays will be adjusted, these adjustments due to the size of the load, circuit characteristics and operating frequency.

Figure 4:
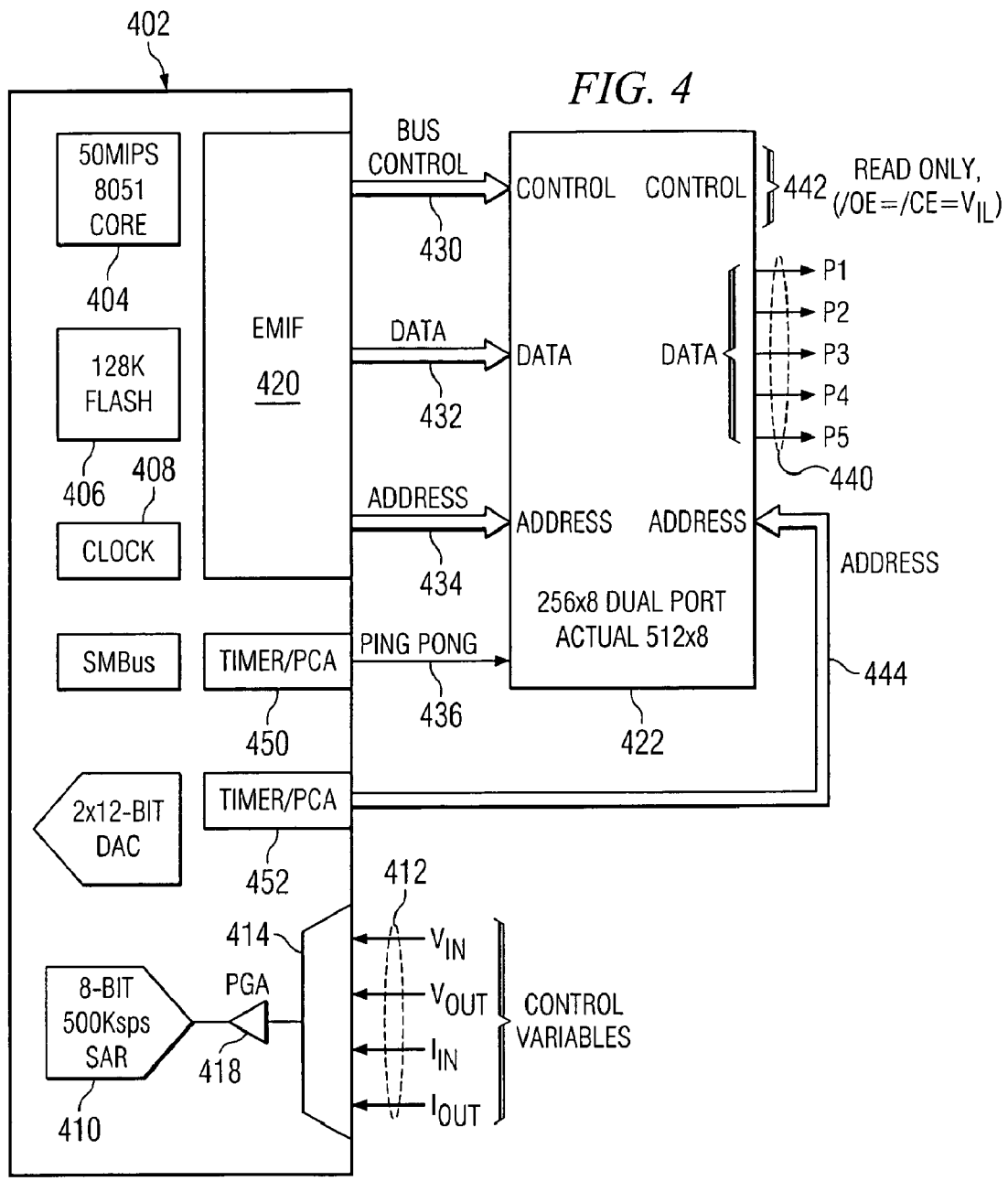
FIG. 4 illustrates a block diagram for the pattern generator for the present disclosure utilizing an external memory.

Referring now to FIG. 4, there is illustrated a block diagram of the control circuit. At the heart of the control circuit is an MCU chip 402 which is an integrated circuit that is manufactured by Cygnal Integrated Products, the present Assignee, as part no. C8051F124. This MCU integrated circuit 402 is described in U.S. patent application Ser. No. 09/885,459, filed Jun. 19, 2000, and entitled FIELD PROGRAMMABLE MIXED-SIGNAL INTEGRATED CIRCUIT, which is incorporated herein by reference. At the heart of this MCU 402 is a 50 MIPS processing core 404 that utilizes an 8051 microprocessor topology. From a memory standpoint, there is provided on chip a flash memory 406, a clock 408 and an analog-to-digital converter 410. The analog-to-digital converter (ADC) 410 is connected to four analog input lines 412 through a multiplexer 414 and a programmable amplifier 418. The analog lines 412 are control variables that convert primary and secondary side voltages and currents into digital signals for use by the processing core 404. Core 502 is connected to a Direct Memory Access function 420 and to a state machine for controlling an external dual-port memory 422. The dual-port memory 422 is configured such that it has a basic size of a 256×8 memory array to store a switching pulse pattern for all of the switching pulses, which memory array 422 is duplicated with a second level of addressing, such that the overall memory is actually 512×8 in size. This is referred to as a "ping pong" memory. The exact capacity of the memory is determined by the timing complexity of the system. Effectively, the memory space is divided into two sections in this embodiment, each 256×8. By utilizing the most significant address bit (MSB) as the ping pong address bit, the data can be written in one part of the memory and extracted from the other part of the memory.

Core 404 calculates updated switching pulses and stores them in a compressed format in memory 406, DMA 420 periodically moves this data into one-half of the dual-port memory 422. The data bus contains a high byte which describes the pulse "hold" time and the low-byte specifies the time a transition occurs. These two pieces of information completely describe the placement and duration of a pulse. Hold time data is available to the state machine while time transition data is available on the databus. In general, the state machine sequentially dictates this data and clocks a latch at times specified by the data. When all addresses in the current half of the memory 422 have been read by the state machine, the most significant address bit is asserted giving the state machine access to the updated data in the other half of the memory 422.

For input of data to the memory from the MCU 402, there is provided a control bus 430 that is output from the interface 420 for providing control signals to the memory 422. Data is output on a data bus 432, this being an 8-bit wide data bus. Address information is output on an address bus 434 that is associated with the chip size of the dual-port memory 422. This is an 8-bit address bus to allow the addressing of 256 8-bit words, the operation of which will be described hereinbelow. In addition, there is provided an additional address bit, the ping pong address bit, on a line 436 that allows the full range of the dual port memory 422 to be addressed. This basically changes the "page" in the memory.

On the board side of memory 422, there are provided five data lines 440, it being understood that there could be upwards of eight data lines, although only five are required for the switching pulses P1-P5. A control input 442 is provided that provides for the Read Only operation, this comprising an Output Enable signal (OE), a Chip Enable signal (CE) and other controls necessary to read data from the memory. Addressing of the access page is provided by an 8-bit address bus 444, this addressing one of the 256 8-bit address locations to output potentially 8-bits, of only which five are used on the data lines 440. However, it is noted that the memory accessed in the Read operation on the board side is a different page than that associated with the Write operation on the chip side. The ping pong address line 436 is operable to select one page of memory for writing up to 256 8-byte words and the other page for reading up to 256 8-byte words. As such, there would be required an inverter not shown for providing a ninth bit to the Read side address input. The ping pong address bit on line 436 is controlled by a first timer 450 with the address on lines 444 controlled by a second timer 452. The timers are operable to be synchronized with the duty cycle, such that the address locations, on the board side for the Read operation are sequenced through from the first location to a second end location which could be the entire 256 8-byte words in the Read operation or less. At the end of each duty cycle, the page will be "flipped" with the ping pong address byte such that the background page written during the previous duty cycle on the chip side can then be read from on the board side. During the Read operation, the interface 420 under control of the processor core 404 is operable to Write any information to the chip side of the memory to change the "pattern" contained therein for output in a subsequent Read operation.

It should be understood that a dual-port memory is illustrated, but any other type of addressing scheme could be utilized. If the processor core memory were fast enough, the operation could actually be multiplexed and a single port memory could be utilized.

Referring now to FIG. 5, there is illustrated an alternate embodiment of the embodiment of FIG. 4 wherein the memory is disposed on chip. An integrated circuit MCU 502 is illustrated which contains a processing core 504 and a memory 506, memory 506 being a memory of the Flash Type. In this embodiment, the memory is a dual port memory that is 16-bits wide (×16) with a small word capacity (typically less than 128 bytes). In this embodiment, the on chip Flash 506 is operable to not only provide more storage for data and the such, but also provide storage for the pattern associated with the pattern generation operation. The operation of the Flash 506 is controlled with a timer block or clock 508 which is operable to operate the Flash 506 as a dual-port memory such that the Read side of the dual-port memory can read one page of memory whereas the Write side writes a separate page of memory. During the Read operation, the addresses are sequenced through from an initial value to a termination value. On the Write side data is randomly written to the locations that need to be changed in order to adjust edges of the pulses, as will be described hereinbelow. As was the case with the embodiment of FIG. 4, there will be provided four data lines 512 that provide the input voltage, output voltage, input current and output current to a multiplexer 514 through a programmable amplifier 516 to an ADC 518. This is utilized by the core 504 for the control operation. The memory output is output to a 5-bit wide bus 520 to provide the switching pulse output values P1-P5 through an input/output (I/O) block 522. This configuration is substantially identical to that of FIG. 4 with the exception that all the circuitry is contained on chip.

Referring now to FIG. 6, there is illustrated a diagrammatic view of the overall operation for both control and pattern generation. In the control operation, there is provided a sensor block 602 that is operable to measure the current and voltages. This is basically the ADC portion of the circuit. This information is measured and then passed to a control algorithm block 604 for the purpose of determining what the pulse width modulation (PWM) variables will be, this primarily being an adjustment to the duty cycle. By measuring the currents and voltages and adjusting the duty cycle to provide the appropriate control, a viable duty cycle can be achieved. This is an iterative process where a new duty cycle value is calculated to provide a "control move" that provides an incremental change to the duty cycle in one direction or the other. This new duty cycle is input to a control register 606. The value in the control register 606 is then passed to the pattern generation portion to allow the control move to be applied.

In the pattern generation operation, the duty cycle is changed and compared to the previous duty cycle to determine what type of change must be facilitated. For example, if the duty cycle decreases by a certain percentage, this will indicate that each edge in each of the switching pulses P1-P5 must be moved relative to the initial edge of switching pulse P1. The pattern is actually stored in a memory area 608 illustrated as a memory map of 5-bits for each row of memory, each row representing a slice of time and each bit representing the value of the associated switching pulse for that slice of time. The value of these bits is controlled by a pattern generator block 610 which is operable to address a particular row that is determined to require a change. It can be seen in the memory map that each column constitutes the sequence of values in time from the beginning of the duty cycle to the end of the duty cycle for each switching pulse. If a value is at a "logic zero," this indicates a low voltage level. If the value is at a logic "one" level value, this indicates a high voltage level. Each row represents a time segment with the total number of rows, i.e., 256, defining the resolution over time of a switching pulse. By changing a logic "zero" adjacent to a logic "one" to a logic "one," this will effectively move the edge transition in one direction or the other. As such, if it is determined that an edge must be moved by two time segments, i.e., two rows, then only two rows need to be addressed.

The pattern generator block 610 is operable to receive as an input the delay constants. This allows all of the edges to be proportionally changed. Additionally, these delay constants can be changed by the user to configure the overall PWM operation on the fly if necessary.

Referring now to FIG. 7, there is illustrated a flow chart for the operation of control. This is initiated at a function block 702 and then proceeds to a function block 704 wherein the system is initialized. During initialization, a initial pattern can be loaded from another area in memory, if necessary, at a set frequency. The initialization is done at a median frequency such that a pattern exists in the memory. This is then applied and then a measurement made, as indicated by a function block 706, of the voltage and current. This voltage and current measurement is then processed through an algorithm to calculate the next change at the duty cycle, as indicated by a function block 708. This change in duty cycle is an iterative procedure which determines in which direction the duty cycle should changed and by how much. This is then stored at the control register, as indicated by a function block 710. The program will then flow back to the input of function block 706 to again measure the voltage and current in the next interface step. Each step of storing the duty cycle in the control register will occur during one Period of the clock $\phi_1$. Once stored in the control register during the Period, the pattern generator will rewrite the pattern and, at the end of the duty cycle, there will be a transfer over to the Read side.

Referring now to FIG. 8, there is illustrated a flow chart depicting the operation of the pattern generator, which is initiated at a block 802. The program then flows to a function block 804 to read the control register and then to a function block 806 to determine if the duty cycle has changed. If not, the program will flow back to the input of function block 804. If the duty cycle has changed, the program will flow to a function block 808 to recalculate the edges of each of the pulses to determine where the rising and falling edges will be. The program then flows to function block 810 to address the various time segments in the memory, i.e., the particular rows, that must have the logic state thereof changed in order to facilitate a move in the rising and falling edges. The program then flows to a function block 812 when the last row of memory associated with the Read sequence has been read out, i.e., at the end of the duty cycle. At this point, the program will flip the memory between pages, i.e., perform the ping pong operation, and then return to the input of the function block 804.

Although the preferred embodiment has been described in detail, it should be understood that various changes, substitutions and alterations can be made therein without departing from the spirit and scope of the invention as defined by the appended claims.

What is claimed is:

1. A method for converting DC power from a first voltage level on an input to a different voltage level on an output for delivery to a load, comprising the steps of:

switching current in a switching operation from the input to the output through an inductive element;

measuring the voltage/current parameters on the input and output;

determining with a control algorithm control parameters necessary to make a control move to effect the switching operation, the control algorithm utilizing as inputs the measured voltage/current parameters;

controlling the switching operation with a digital control system, which digital control system is operable to be controlled by the control algorithm;

receiving configuration data on a serial data bus for configuring the control algorithm; and modifying the operation of the control algorithm in response to receiving the configuration information.

2. The method of claim 1, wherein the step of modifying the operation occurs on the fly with the step of controlling.

3. The method of claim 1, wherein the switching operation is a pulse width controlled operation and the step of controlling includes generating variable width control pulses with a pulse width modulator (PWM).

4. The method of claim 3, wherein the step of generating includes the step of delaying at least one edge of one of the control pulses relative to another thereof in a common switching cycle by a predetermined delay value, and the configuration data includes the predetermined delay value.

5. The method of claim 1, wherein the digital control system includes an instruction based processor for at least a portion of the operation thereof.

6. The method of claim 1, and further comprising the step of storing the configuration information in a memory.

7. The method of claim 1, wherein the serial data bus is an SM Bus.

* * * * *